United States Patent
Narisawa et al.

(10) Patent No.: US 10,434,861 B2
(45) Date of Patent: Oct. 8, 2019

(54) POWER EQUIPMENT UNIT AND VEHICLE

(71) Applicant: HONDA MOTOR CO., LTD., Tokyo (JP)

(72) Inventors: Masato Narisawa, Saitama (JP); Masashi Abe, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 34 days.

(21) Appl. No.: 15/697,557

(22) Filed: Sep. 7, 2017

(65) Prior Publication Data
US 2018/0072146 A1 Mar. 15, 2018

(30) Foreign Application Priority Data

Sep. 13, 2016 (JP) .................................. 2016-178646

(51) Int. Cl.
*B60R 16/02* (2006.01)
*B60K 1/04* (2019.01)

(52) U.S. Cl.
CPC ........ *B60K 1/04* (2013.01); *B60K 2001/0422* (2013.01); *B60R 16/0215* (2013.01); *B60Y 2400/61* (2013.01); *B60Y 2410/10* (2013.01); *B60Y 2410/115* (2013.01)

(58) Field of Classification Search
CPC ...... B60K 1/00; B60K 1/04; B60K 2001/005; B60K 2001/0438; B60L 11/1816; B60L 11/1877; B60R 16/0207
See application file for complete search history.

(56) References Cited

U.S. PATENT DOCUMENTS

| | | | | | |
|---|---|---|---|---|---|
| 6,460,642 | B1* | 10/2002 | Hirano | ..................... | B60K 6/40 180/271 |
| 8,288,024 | B2* | 10/2012 | Hayashi | .............. | H01M 2/1072 429/1 |
| 8,561,743 | B2* | 10/2013 | Iwasa | ....................... | B60K 1/04 180/68.5 |
| 8,794,365 | B2* | 8/2014 | Matsuzawa | .............. | B60K 1/04 180/65.21 |
| 8,899,360 | B2* | 12/2014 | Mochizuki | .......... | B60R 16/0215 180/65.1 |

(Continued)

FOREIGN PATENT DOCUMENTS

| | | | |
|---|---|---|---|
| JP | 2004-017808 | A | 1/2004 |
| JP | 2004-345453 | A | 12/2004 |

(Continued)

OTHER PUBLICATIONS

Feb. 27, 2018, Japanese Office Action issued for related JP Application No. 2016-178646.

*Primary Examiner* — Emma K Frick
(74) *Attorney, Agent, or Firm* — Paratus Law Group, PLLC

(57) ABSTRACT

A power equipment unit includes: a power equipment which supplies electric power to a motor; a controller which controls the power equipment; and a harness which connects the power equipment and the controller. The power equipment and the controller are disposed so as to be adjacent to each other in a forward/backward direction with a space interposed therebetween, and the harness includes: a first harness part extending through the space in a vertical direction; and a controller connecting part connected to the controller from below.

3 Claims, 10 Drawing Sheets

(56) References Cited

U.S. PATENT DOCUMENTS

| | | | | |
|---|---|---|---|---|
| 8,932,769 B2* | 1/2015 | Ohashi | ............... | B62D 25/20 |
| | | | | 180/65.31 |
| 8,939,795 B2* | 1/2015 | Tsuchiya | ............ | H01R 13/6581 |
| | | | | 439/373 |
| 9,073,426 B2* | 7/2015 | Tachikawa | ............... | B60K 1/04 |
| 9,108,502 B2* | 8/2015 | Yamanaka | ............... | B60K 6/40 |
| 9,490,460 B2* | 11/2016 | Yanagi | ............... | H01M 2/1083 |
| 9,623,756 B2* | 4/2017 | Suzuki | ................... | B60L 3/003 |
| 9,796,293 B2* | 10/2017 | Ito | ...................... | B60L 11/1877 |
| 9,849,768 B2* | 12/2017 | Hayashi | ................. | B60R 16/04 |
| 2003/0034186 A1* | 2/2003 | Morita | ................. | B60L 3/0015 |
| | | | | 180/65.1 |
| 2004/0235315 A1 | 11/2004 | Masui et al. | | |
| 2008/0196957 A1* | 8/2008 | Koike | ..................... | B60K 1/04 |
| | | | | 180/68.5 |
| 2010/0066166 A1* | 3/2010 | Yoshinaga | ............ | B60L 3/0046 |
| | | | | 307/9.1 |
| 2012/0018238 A1* | 1/2012 | Mizoguchi | ............... | B60K 1/04 |
| | | | | 180/68.5 |
| 2012/0021301 A1* | 1/2012 | Ohashi | .................... | B60K 1/04 |
| | | | | 429/400 |
| 2013/0119760 A1* | 5/2013 | Amano | ............... | B60R 16/0239 |
| | | | | 307/10.1 |
| 2013/0162075 A1* | 6/2013 | Chinavare | ............ | H05K 9/0098 |
| | | | | 310/85 |
| 2013/0241282 A1* | 9/2013 | Ikeno | .................. | B60R 16/0215 |
| | | | | 307/10.1 |
| 2014/0090908 A1* | 4/2014 | Amano | .................... | B60K 1/00 |
| | | | | 180/65.1 |
| 2014/0151086 A1 | 6/2014 | Yamanaka | | |
| 2014/0374180 A1* | 12/2014 | Katayama | ................ | B60K 1/04 |
| | | | | 180/68.5 |
| 2015/0367718 A1 | 12/2015 | Hayashi et al. | | |

FOREIGN PATENT DOCUMENTS

| | | |
|---|---|---|
| JP | 2009-292324 A | 12/2009 |
| JP | 2010-285070 A | 12/2010 |
| JP | 2014-108697 A | 6/2014 |
| JP | 2016-117365 A | 6/2016 |
| WO | WO 2013/188680 A1 | 12/2013 |
| WO | WO 2014/128869 A1 | 8/2014 |

* cited by examiner

POWER EQUIPMENT UNIT AND VEHICLE

CROSS-REFERENCE TO RELATED APPLICATION (S)

This application claims priority from Japanese Patent Application No. 2016-178646 filed on Sep. 13, 2016, the entire contents of which are incorporated herein by reference.

FIELD

The present invention relates to a power equipment unit including power equipment, a controller, and a harness, and a vehicle.

BACKGROUND

A power equipment unit for housing high voltage system equipment such as a battery (power equipment), an inverter (a power converter), or an ECU (a controller) is mounted in a vehicle such as a hybrid vehicle that travels with a combination of an engine and a motor (for example, see JP-A-2010-285070).

The power equipment unit is generally disposed at places having high safety against the shock in the event of the collision of the vehicle, but is necessary to securely protect a high-voltage wiring (harness) that connects pieces of high voltage system with each other so as not to be damaged. In particular, strict protection is required for high-voltage wiring (for example, wiring for detecting battery voltage that connects a battery with ECU) that is not interposed with a fuse.

SUMMARY

The invention is to provide a power equipment unit and a vehicle capable of protecting a harness from a shock in the event of a vehicle collision while effectively utilizing a dead space and preventing water from entering a controller.

The invention provides following aspects (1) to (4).

(1) A power equipment unit (e.g., a power equipment unit 20 in embodiment) including:

a power equipment (e.g., a battery 50 in embodiment) which supplies electric power to a motor (e.g., a motor generator 3b in embodiment);

a controller (e.g., ECU 70 in embodiment) which controls the power equipment; and a harness (e.g., a control system harness 100 in embodiment) which connects the power equipment and the controller, wherein the power equipment and the controller are disposed so as to be adjacent to each other in a forward/backward direction with a space (e.g., a space S in embodiment) interposed therebetween, and the harness includes: a first harness part (e.g., a first harness part 101 in embodiment) extending through the space in a vertical direction; and a controller connecting part (e.g., an ECU connecting part 105 in embodiment) connected to the controller from below.

The "forward/backward direction" does not need to coincide with a forward/backward direction of the vehicle, but may be a leftward/rightward direction of the vehicle.

(2) The power equipment unit according to (1), wherein the harness further includes a second harness part (e.g., a second harness part 102 in embodiment) extending above the power equipment in the forward/backward direction, a third harness (e.g., a third harness part 103 in embodiment) extending in a vertical direction on a side of the power equipment opposite to the controller, and a power equipment connecting part (e.g., a battery connecting part 106 in embodiment) connected to the power equipment from below.

(3) The power equipment unit according to (1) or (2), further includes a power converter (e.g., an inverter 60 in embodiment) that converts the electric power of the power equipment, wherein the power equipment and the power converter are disposed to be adjacent to each other in a direction orthogonal to the forward/backward direction and the vertical direction, and the second harness part is disposed around a border between the power equipment and the power converter.

(4) A vehicle (e.g., a vehicle 1 in embodiment) in which the power equipment unit according to any one of (1) to (3) is mounted, wherein the power equipment unit is housed in a power equipment unit housing (e.g., a power equipment unit housing 4a in embodiment) which is formed in a recessed manner in a floor panel (e.g., a floor panel 4 in embodiment), and the power equipment unit housing is provided below a seat (e.g., a front seat 5 in embodiment).

According to the invention (1), the first harness part of the harness connecting the power equipment and the controller extends in the vertical direction through the space formed between the power equipment and the controller. Since the space formed between the power equipment and the controller has generally high safety against the shock in the event of the collision of the vehicle, it is possible to protect the harness from the shock in the event of the collision of the vehicle while effectively utilizing a dead space. Further, the harness includes the controller connecting part that is connected to the controller from below, and thus water such as dew drops is prevented from entering the controller through the harness.

According to the invention (2), since the harness includes the second harness part extending above the power equipment in the forward/backward direction or the leftward/rightward direction, the third harness extending in the vertical direction on the side of the power equipment opposite to the controller, and the power equipment connecting part connected to the power equipment from below, water such as dew drops is prevented from entering the power equipment through the harness.

According to the invention (3), since the second harness part of the harness is disposed around the border between the power equipment and the power converter, the harness can be disposed while effectively utilizing a space in the power equipment unit.

According to the invention (4), since the power equipment unit is housed in the power equipment unit housing formed in the recessed manner in the floor panel and the power equipment unit housing is provided below the seat, it is possible to dispose the power equipment unit at the place having high safety against the shock in the event of the collision of the vehicle and to protect the power equipment, the controller, and the harness from the shock in the event of the collision of the vehicle.

BRIEF DESCRIPTION OF DRAWINGS

FIGS. 9A and 9B are explanatory views illustrating a procedure of demounting the inverter wherein FIG. 9A is an explanatory view illustrating a state before the positioning part of the harness holder is rotated, and FIG. 9B is an explanatory view illustrating a state in which the positioning part of the harness holder is rotated.

DETAILED DESCRIPTION

Figure 1:
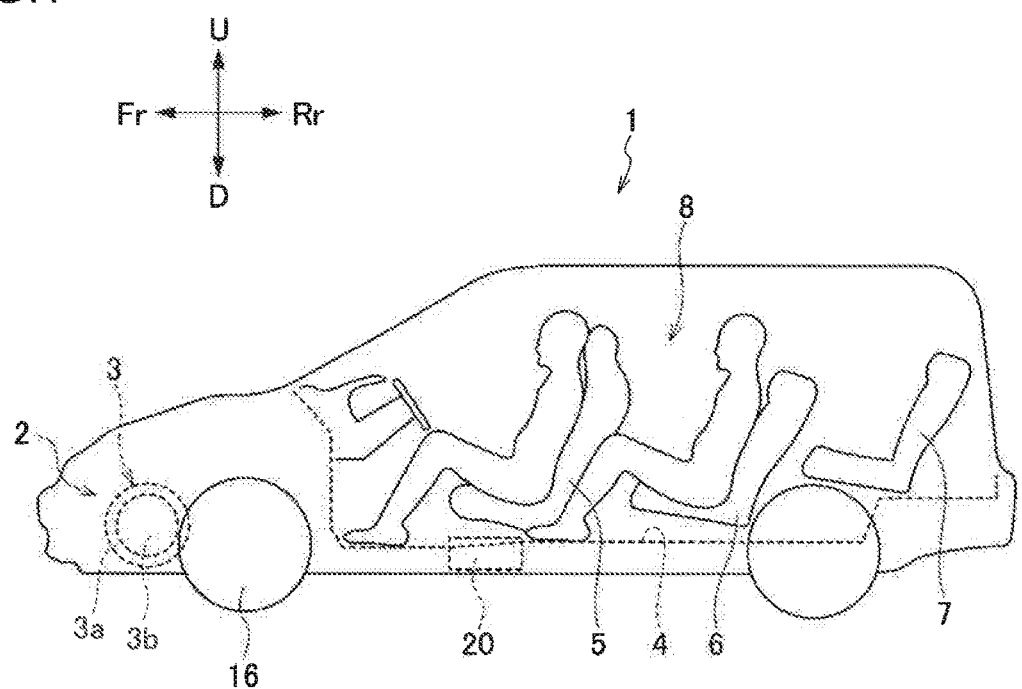
FIG. 1 is a schematic side view illustrating a vehicle having a power equipment unit according to an embodiment of the present invention.

Hereinafter, an embodiment of the present invention will be described in detail with reference to the attached drawings. The drawings shall be viewed in a direction of a reference sign. In the following description, according to a direction viewed from a driver, the front of a vehicle in the drawings is defined as Fr, the rear as Rr, the left as L, the right as R, the upper side as U, and the lower side as D.

In a vehicle 1 as illustrated in FIG. 1, a power unit 3 having an engine 3a and a motor generator 3b installed in series in an engine room 2 in the front of the vehicle. The motor generator 3b is for instance a three-phase alternating current motor. The vehicle 1 is a hybrid vehicle that is driven by the engine 3a and/or the motor generator 3b and can recover power from the motor generator 3b, for instance, during deceleration of the vehicle.

In the vehicle 1, driving forces of the engine 3a and the motor generator 3b are transmitted to front wheels 16 that are driving wheels. When a driving force is transmitted from the front wheels 16 to the motor generator 3b, for instance, during deceleration of the vehicle 1, the motor generator 3b functions as an electric generator to generate a so-called regenerative braking force, and kinetic energy of the vehicle 1 is recovered as electric energy. The recovered electric energy is charged to a battery 50 via an inverter 60 to be described below.

A passenger compartment 8 in which front seats 5, middle seats 6, and rear seats 7 are arranged on a floor panel 4 is provided in the rear of the engine room 2. The passenger compartment 8 is provided in the rear of the engine room 2 that becomes a crushable zone at the time of a head-on collision, and thereby becomes a place that has high safety against a shock at the time of the head-on collision.

Figure 2:
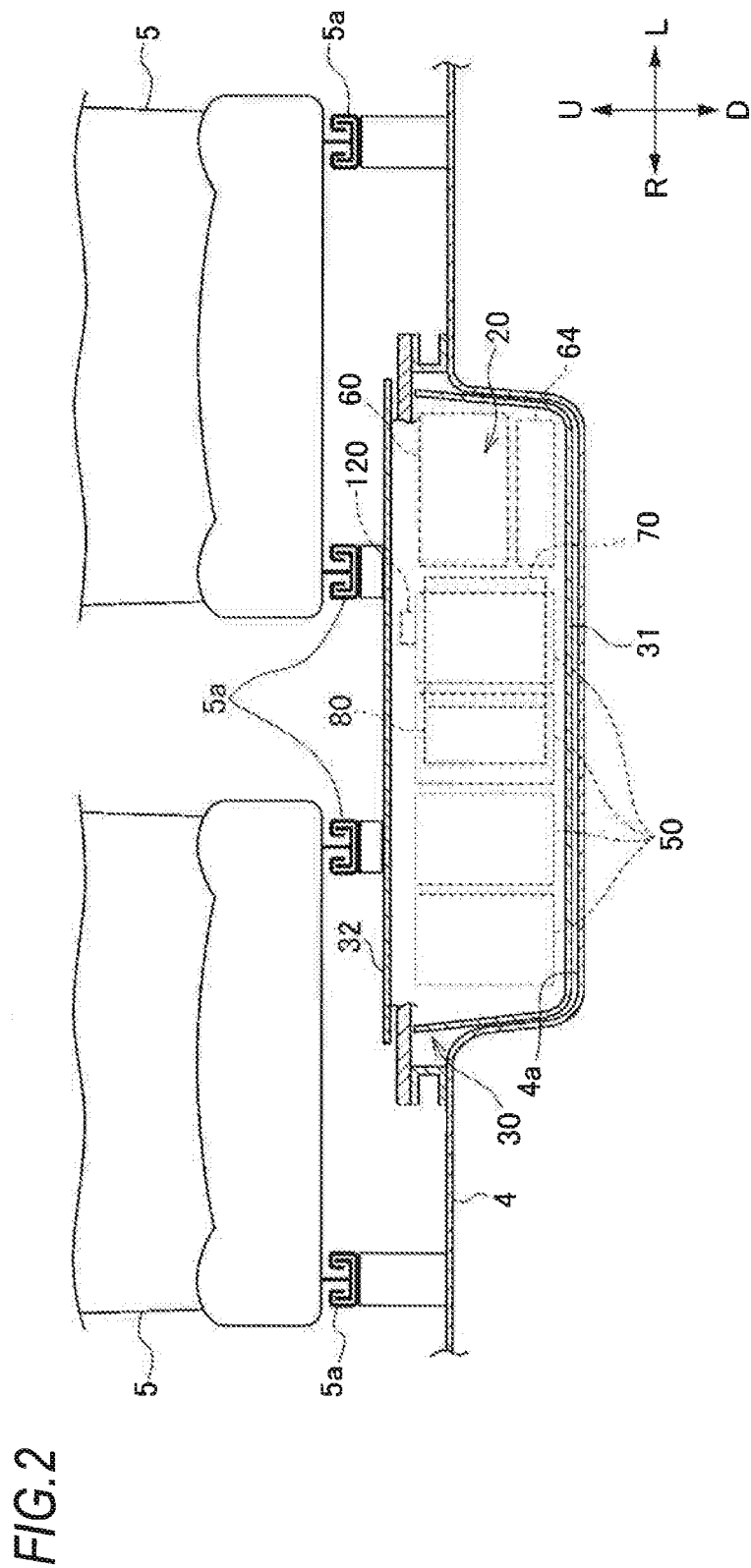
FIG. 2 is a schematic sectional view of main parts of the vehicle illustrating arrangement of the power equipment unit.

As illustrated in FIGS. 1 and 2, a power equipment unit 20 connected to the power unit 3 via a power cable (not shown) is disposed below the front seats 5 (driver's and front passenger's seats) in the passenger compartment 8. The power equipment unit 20 is housed in a power equipment unit housing 4a formed in a recessed manner in the floor panel 4, and seat rails 5a for adjusting positions of the front seats 5 in a forward/backward direction are arranged above the power equipment unit 20 housed in the power equipment unit housing 4a at predetermined intervals so as to straddle the power equipment unit 20 in the forward/backward direction.

As illustrated in FIGS. 2 to 5, the power equipment unit 20 is a unit that chiefly includes the battery 50, the inverter 60, a DC-DC converter 64, an ECU 70, a junction box 80, wiring 90 electrically connecting them, and a case 30 housing them, and has an air-cooled cooling function of cooling the battery 50, the inverter 60, and the DC-DC converter 64 with air taken in from the passenger compartment 8 and returning the air after the cooling to the passenger compartment 8.

Figure 3:
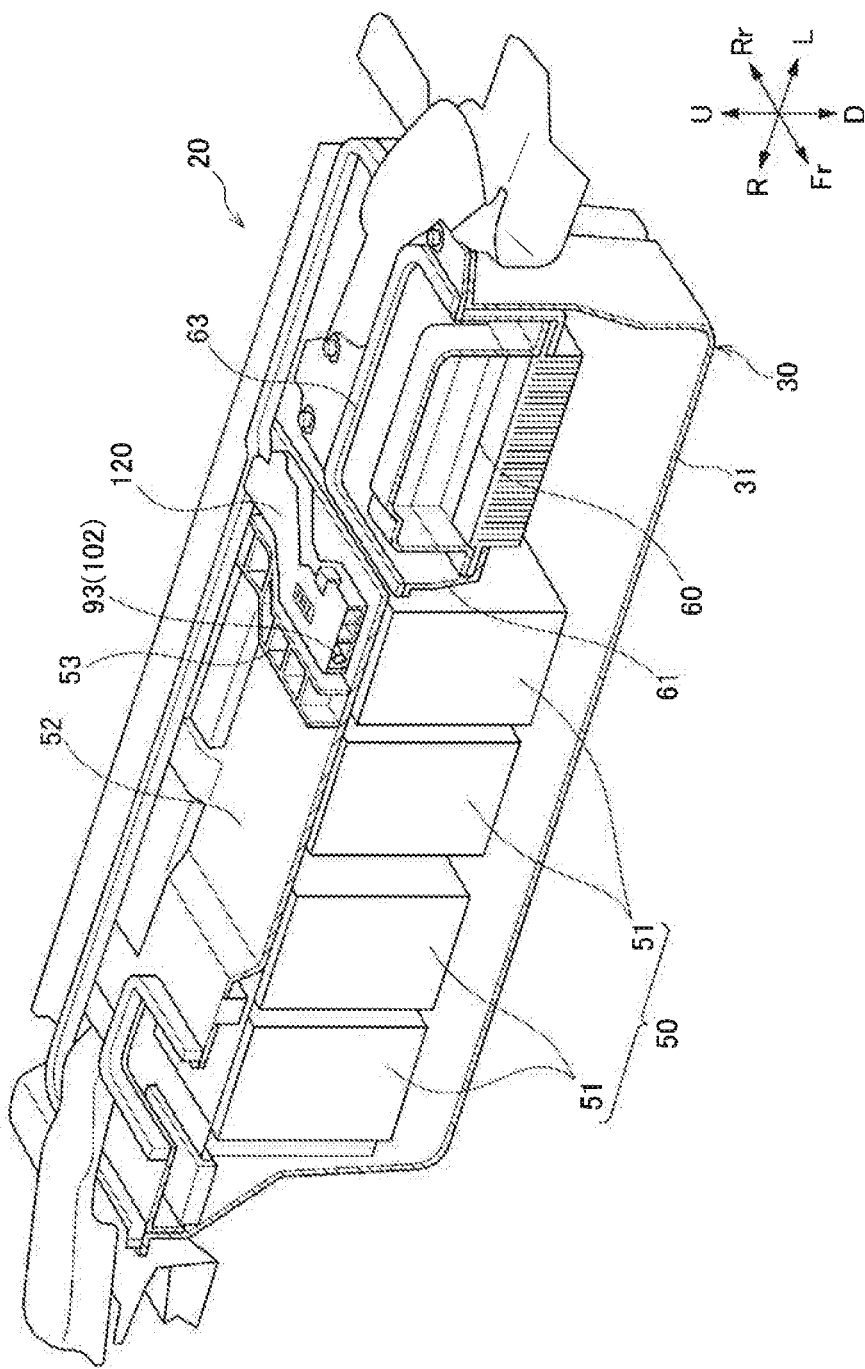
FIG. 3 is a sectional perspective view of the power equipment unit.
Figure 4:
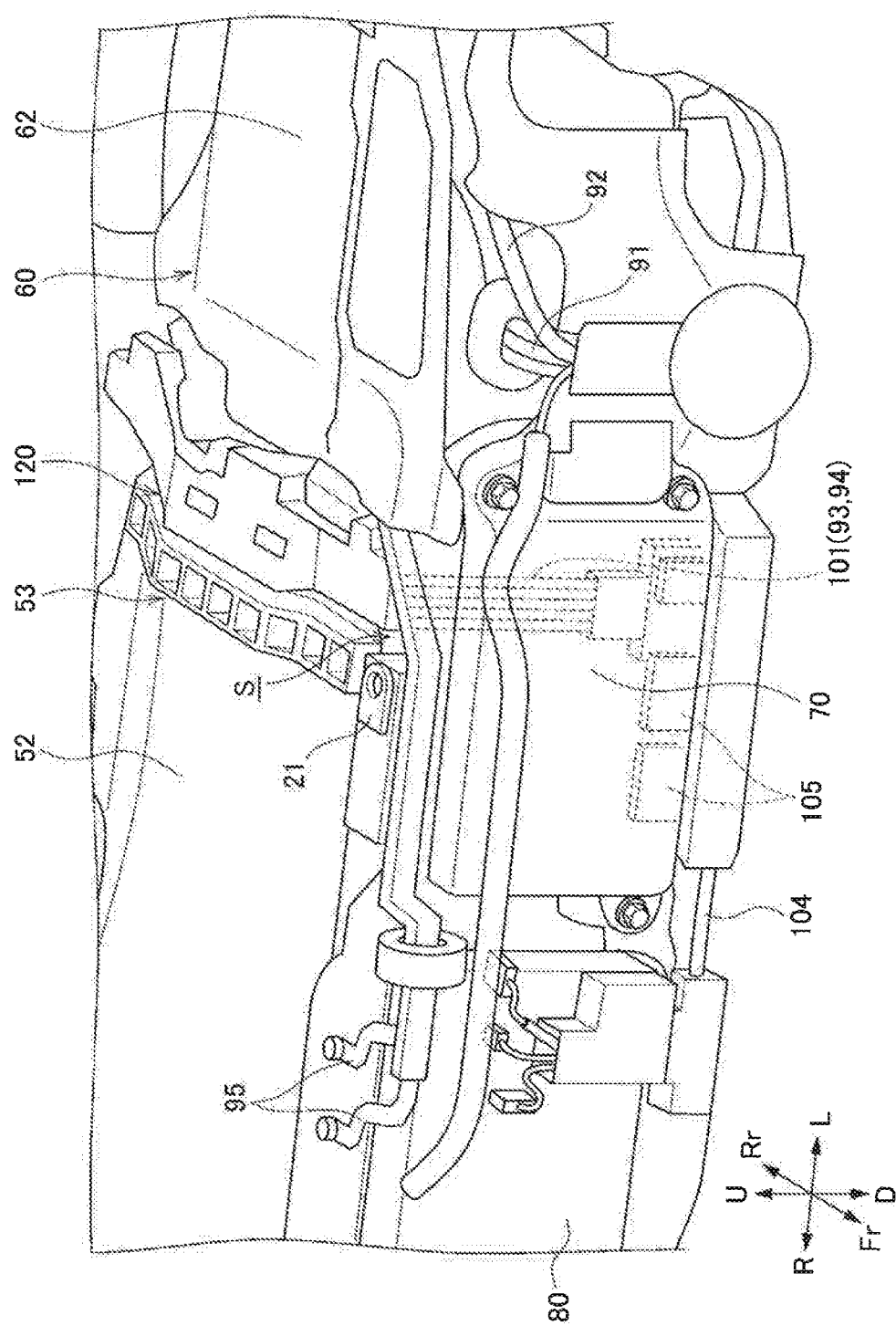
FIG. 4 is a perspective view of illustrating main parts of the power equipment unit.

The case 30 of the power equipment unit 20 includes a case main body 31 having the shape of a bottomed container, and a lid member 32 that covers an upper portion of the case main body 31. As illustrated in FIGS. 3 and 4, the battery 50 and the inverter 60 are disposed inside the case 30 to be adjacent to each other in a leftward/rightward direction, the ECU 70 is disposed in front of the battery 50 to be adjacent to the battery across a space S, and the junction box 80 is disposed in front of the battery 50 to be adjacent to the ECU 70 in the leftward/rightward direction. A maintenance/checkup plug 21 that is a switch for breaking a circuit of the battery 50 to safely do work when maintenance of the battery 50 is performed is provided at a part of the space S. The battery 50 of the present embodiment is made up of four battery modules 51 arranged in parallel in the leftward/rightward direction, but a number and array of the four battery modules 51 constituting the battery 50 can be arbitrarily changed.

The inverter 60 is a power converter that converts power of the battery 50. The inverter 60 converts a direct current obtained from the battery 50 into a three-phase alternating current and supplies the three-phase alternating current to the motor generator 3b, and thereby can drive the motor generator 3b. The inverter 60 converts a regenerative current of the three-phase alternating current obtained from the motor generator 3b into a direct current, and thereby can charge the battery 50. The DC-DC converter 64 that converts a high-voltage direct current obtained from the battery 50 into a low-voltage direct current and supplies the low-voltage direct current to a low-voltage battery (not shown) or the like is disposed below the inverter 60. In FIG. 3, the DC-DC converter 64 is omitted.

The ECU 70 is a controller, and performs charge/discharge control or the like of the battery 50. The battery 50, the inverter 60, the ECU 70, and the junction box 80 are high voltage system equipment that treats the high-voltage current and, even in the case in which the power equipment unit 20 receives a shock in the event of the collision of the vehicle, strength and arrangement thereof are set to be able to withstand the shock. The junction box 80 is a unit for which terminals used for connection, branch, relay, etc., or safeguards such as a fuse are provided.

Figure 5:
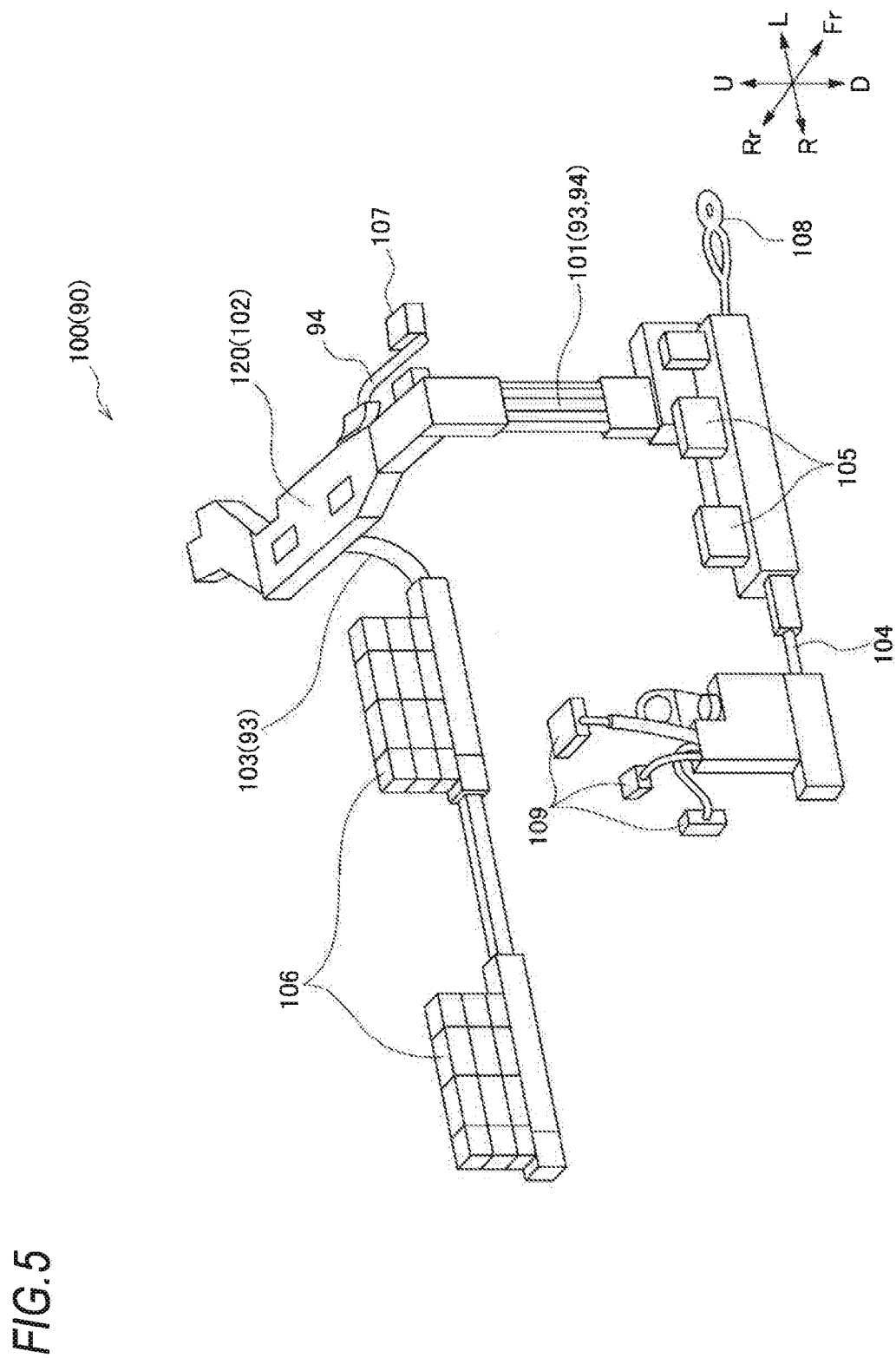
FIG. 5 is a perspective view illustrating a control system harness of the power equipment unit.
Figure 7:
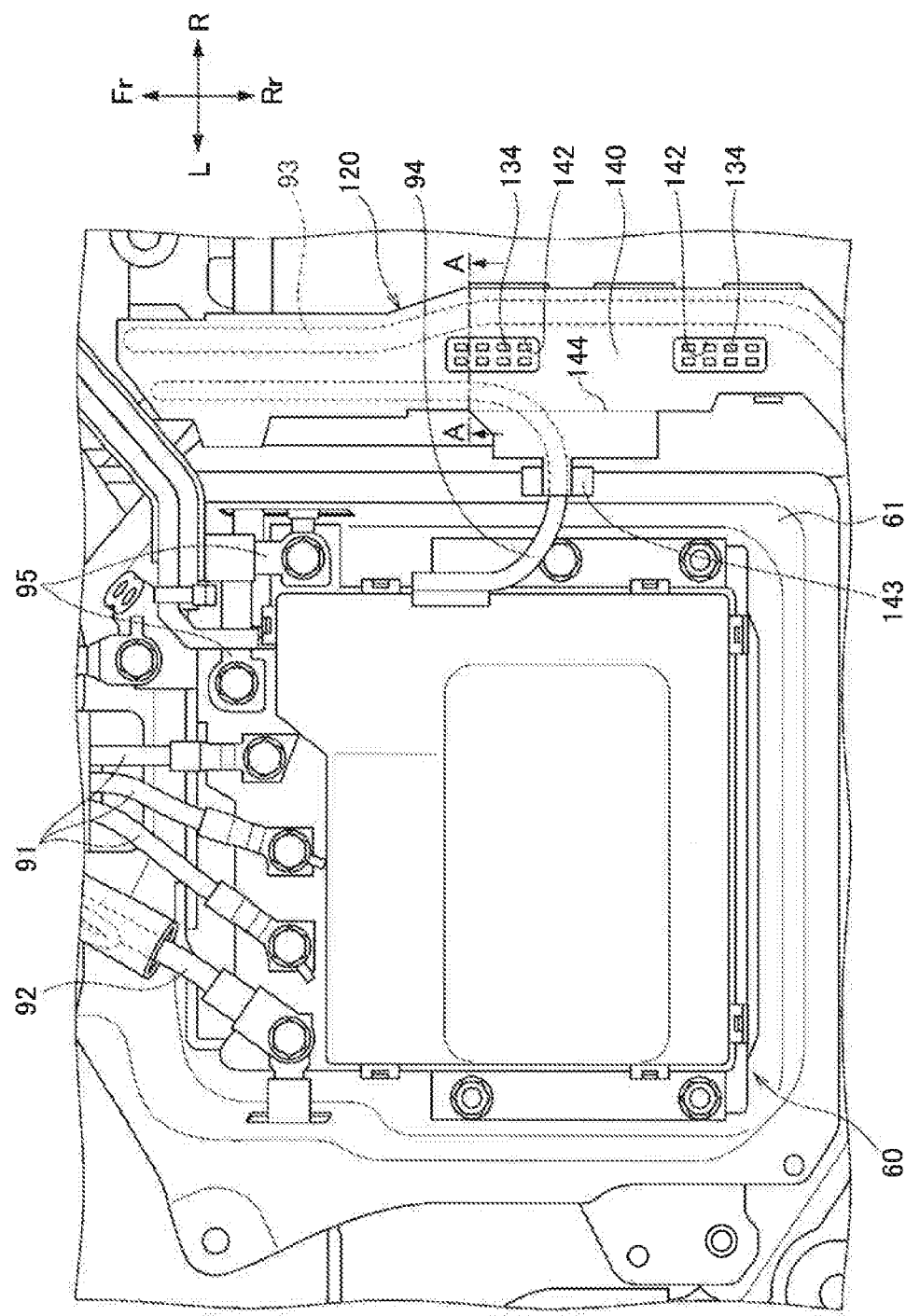
FIG. 7 is a top view of main parts illustrating the harness holder and the inverter (with no cover) of the power equipment unit.

As illustrated in FIGS. 5 and 7, the wiring 90 includes a three-phase line 91 that connects the inverter 60 and the motor generator 3b, a low-voltage line 92 that supplies the low-voltage direct current converted at the DC-DC converter 64 to the ECU 70 or the junction box 80, a battery voltage detection line 93 that connects the battery 50 and the ECU 70, a PCU control line 94 that connects the inverter 60 and the ECU 70, and a high-voltage line 95 that connects the battery 50 and the inverter 60. The battery voltage detection line 93 is a high-voltage line in which no fuse is interposed, and requires strict protection.

As illustrated in FIG. 5, the battery voltage detection line 93 and the PCU control line 94 are formed into an assembly as a control system harness 100. The control system harness 100 includes a first harness part 101 that extends in front of the battery 50 in a vertical direction, a second harness part 102 that extends above the battery 50 in a forward/backward direction, a third harness part 103 that extends at the rear of the battery 50 in the vertical direction, and a fourth harness part 104 that extends below the ECU 70 and the junction box 80 in a leftward/rightward direction.

The control system harness 100 includes an ECU connector 105 that is provided at a lower end side of the first harness part 101 and is connected to the ECU 70 from below, a battery connector 106 that is provided at a lower end side of the third harness part 103 and is connected to the battery 50 from below, a PCU connector 107 that is provided at an intermediate portion of the second harness part 102 and is connected to the inverter 60, a low-voltage line connector 108 that is provided at one end side of the fourth harness part 104 and is connected to the low-voltage line 92, and a J/B connector 109 that is provided at the other end side of the fourth harness part 104 and is connected to the junction box 80. According to the ECU connector 105 and the battery connector 106, they are connected to the ECU 70 and the battery 50 from below, and thus water such as dew drops is prevented from entering the ECU 70 or the battery 50 through the control system harness 100.

That is, the battery voltage detection line 93 is configured such that one end side thereof is connected to the battery 50 from below via the battery connector 106, and the other end side thereof reaches a lower side of the ECU 70 through the third harness part 103, the second harness part 102, and the first harness part 101 and is connected to the ECU 70 from below via the ECU connector 105.

The PCU control line 94 is configured such that one end side thereof is connected to the inverter 60 via the PCU connector 107, and the other end side thereof reaches the lower side of the ECU 70 through the second harness part 102 and the first harness part 101 and is connected to the ECU 70 from below via the ECU connector 105.

The low-voltage line 92 is configured such that one end side thereof is connected to the DC-DC converter 64, and the other end side thereof is connected to the low-voltage line connector 108. The fourth harness part 104 connected to the low-voltage line connector 108 reaches lower sides of the ECU 70 and the junction box 80, and is connected to the ECU 70 and the junction box 80 from below via the ECU connector 105 and the J/B connector 109.

The first harness part 101, the second harness part 102, and the third harness part 103 which the battery voltage detection line 93 in which no fuse is interposed passes need to be protected from the shock in the event of the collision of the vehicle. Especially, the first harness part 101 that is disposed to extend in front of the battery 50 in the vertical direction and is easily affected at the time of head-on collision is required for strict protection.

The first harness part 101 of the present embodiment is disposed to extend through the space S formed between the battery 50 and the ECU 70 in the vertical direction. With this configuration, the first harness part 101 is disposed using the space S between the battery 50 and the ECU 70 provided in places having high safety against the shock in the event of the collision of the vehicle, and thereby the first harness part 101 can be reliably protected from the shock in the event of the collision of the vehicle.

Figure 6:
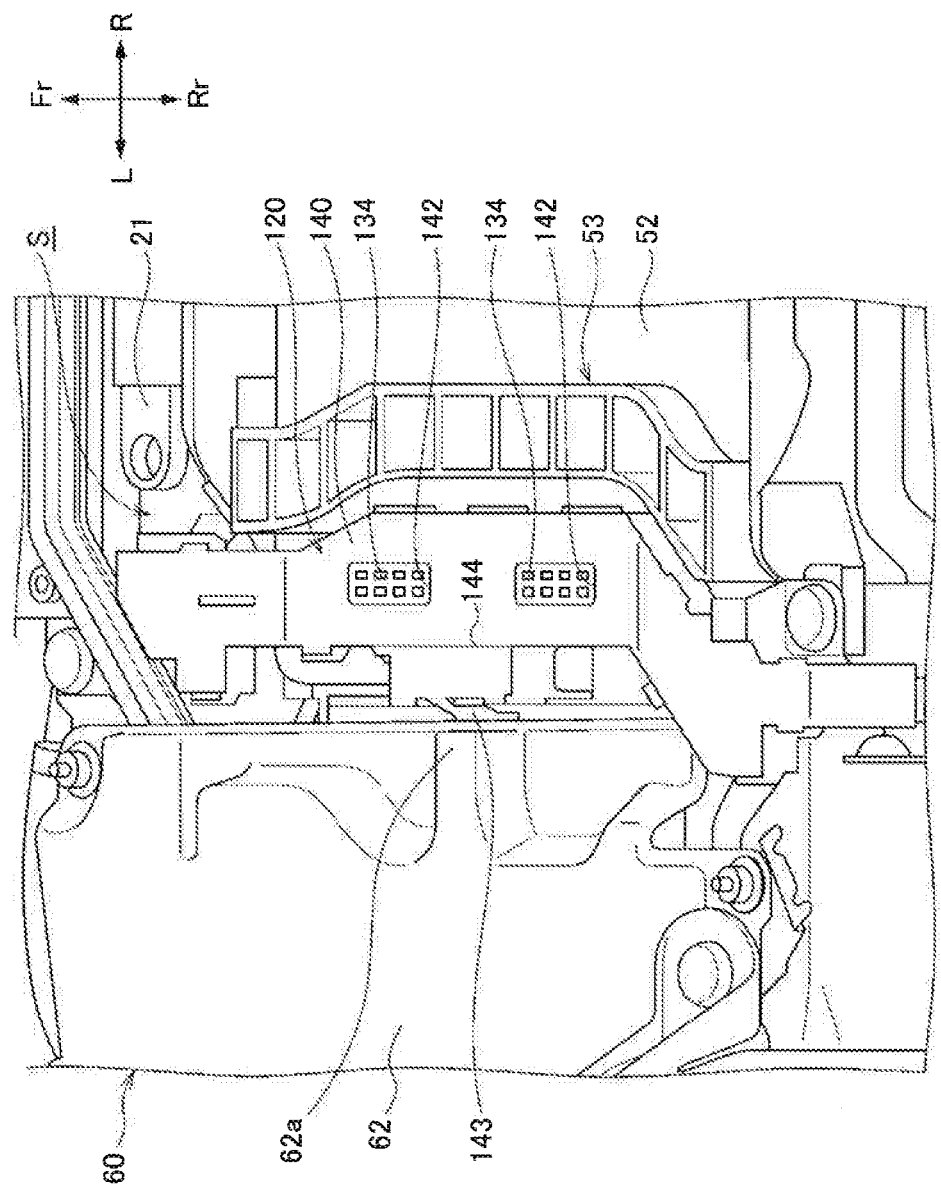
FIG. 6 is a perspective view of main parts illustrating a harness holder and an inverter (with a cover) of the power equipment unit.

The second harness part 102 of the present embodiment is disposed around a border between the battery 50 and the inverter 60. With this configuration, a space existing at the border between the battery 50 and the inverter 60 can be used. The second harness part 102 is disposed on a battery cover covering the battery 50 or a duct member such as an intake duct disposed above the battery 50. In the present embodiment, the second harness part 102 is disposed on the intake duct 52 that supplies cooling air to the battery 50. As illustrated in FIGS. 3, 4 and 6, the intake duct 52 is provided with a high rigidity part 53 that is formed by erecting a plurality of ribs at a position adjacent to the second harness part 102.

However, in the vehicle 1 of the present embodiment, as illustrated in FIG. 2, the border between the battery 50 and the inverter 60 is located below the seat rails 5a. Thus, when the seat rails 5a are intruded into the power equipment unit 20 in the event of the collision of the vehicle, the second harness part 102 may be damaged.

The power equipment unit 20 of the present embodiment includes a harness holder 120 that can protect the second harness part 102 even when the seat rails 5a are intruded thereinto. The harness holder 120 of the present embodiment will be described below with reference to FIGS. 6 to 10.

The harness holder 120 includes a holder main body 130 whose upper portion is open, and a holder cover 140 that covers the upper portion of the holder main body 130. The holder main body 130 integrally has a base 131 and a pair of sidewalls 132 that stand up from opposite ends in a width direction thereof, and the second harness part 102 is housed in a space surrounded with the base 131 and the pair of sidewalls 132. A pullout port 133 for pulling out the PCU control line 94 is formed in the middle of one of the sidewalls 132 in a longitudinal direction, and the PCU control line 94 pulled out from the pullout port 133 is connected to the inverter 60 via the PCU connector 107.

Further, each reinforced part 134 which has a block-shape and which extends upward from the base 131 is integrally provided on the holder main body 130. A width dimension of the reinforced part 134 is set to be as wide as possible within a range in which the housing of the second harness part 102 is not obstructed, and a height dimension of the reinforced part 134 is set to be identical to or higher than that of the sidewall 132. The two reinforced parts 134 are provided on the holder main body 130 of the present embodiment at a predetermined interval in a longitudinal direction, but the number of reinforced parts 134 can be arbitrarily changed.

The holder cover 140 of the present embodiment is formed of a member independent of the holder main body 130, and is mounted on the holder main body 130 to cover the upper portion of the holder main body 130. A plurality of engagement claws 141 that line up at a predetermined interval in a longitudinal direction are integrally provided at opposite ends of the holder cover 140 in a width direction, and these engagement claws 141 are engaged with engagement holes 135 formed at the holder main body 130 side. Thereby, the holder cover 140 is fixed to the holder main body 130.

Further, a plurality of openings 142 through which the reinforced parts 134 of the holder main body 130 pass are formed in the holder cover 140. According to this harness holder 120, a load path along which, while the shock applied from above in the event of the collision of the vehicle is being received by the plurality of reinforced parts 134, the received shock is propagated to, for instance, a holding member of the battery 50 which is a strength component. Thus, even when the seat rails 5a are intruded into the power equipment unit 20, for instance, in the event of the collision of the vehicle, the second harness part 102 housed in the harness holder 120 can be protected, and damage to the second harness part 102 can be prevented.

Figure 8:
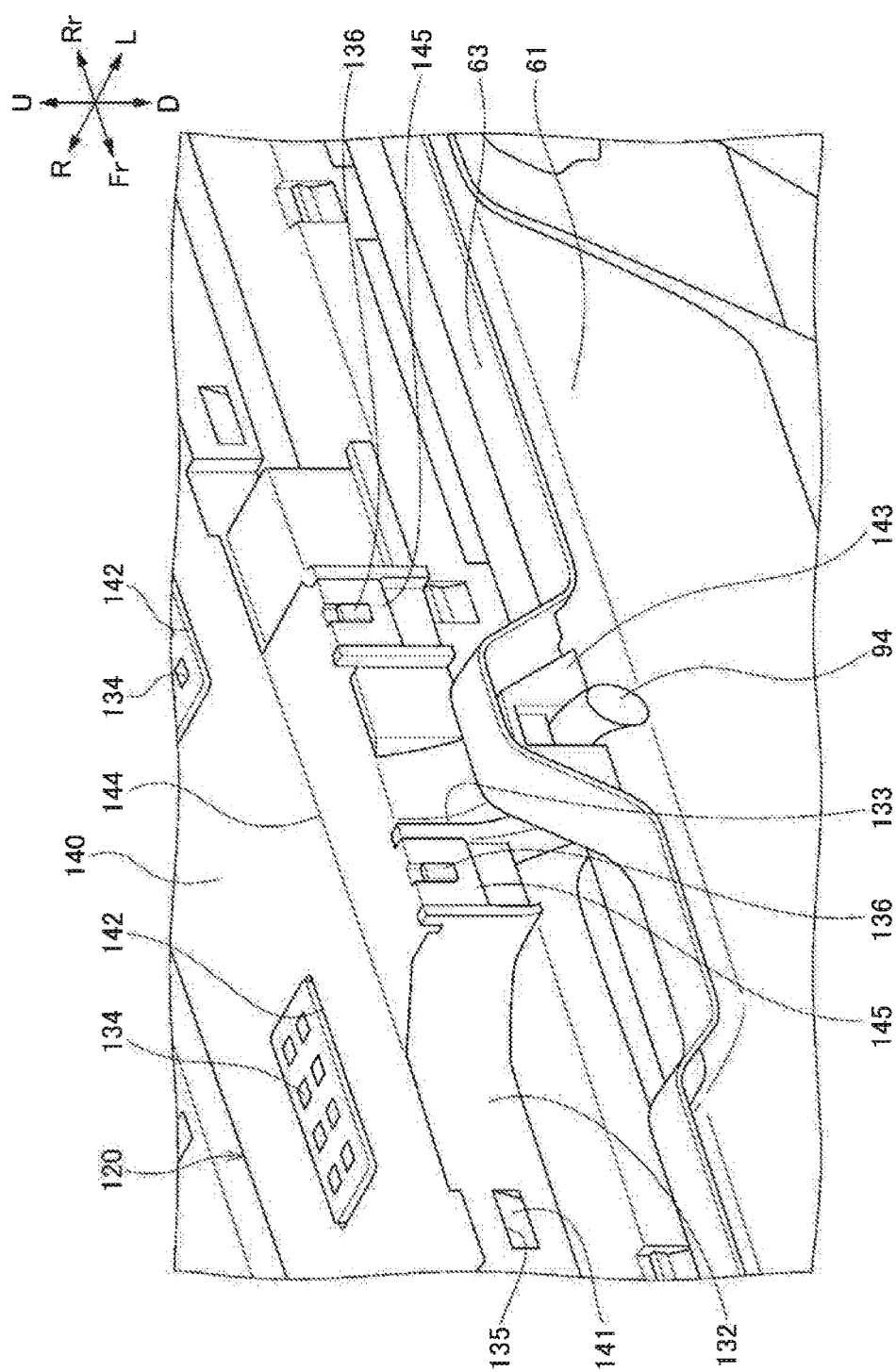
FIG. 8 is a perspective view illustrating a positioning part of the harness holder.

Meanwhile, the PCU control line 94 pulled out from the pullout port 133 of the holder main body 130 is connected to the inverter 60 through a space between a PCU case 61 supporting the inverter 60 and a PCU cover 62 covering an upper side of the inverter 60. As illustrated in FIG. 6, a recess 62a for passing the PCU control line 94 is formed in the PCU cover 62. As illustrated in FIG. 8, a gap between the PCU cover 62 and the PCU case 61 is blocked using a sound-proof sealant 63 for preventing sound leakage from the inverter 60. Therefore, to prevent pinching of the PCU control line 94 caused by the PCU cover 62 or sound-proof sealing failure caused by positional deviation of the PCU control line 94, a pullout position of the PCU control line 94 requires accurate positioning.

Figure 9A:
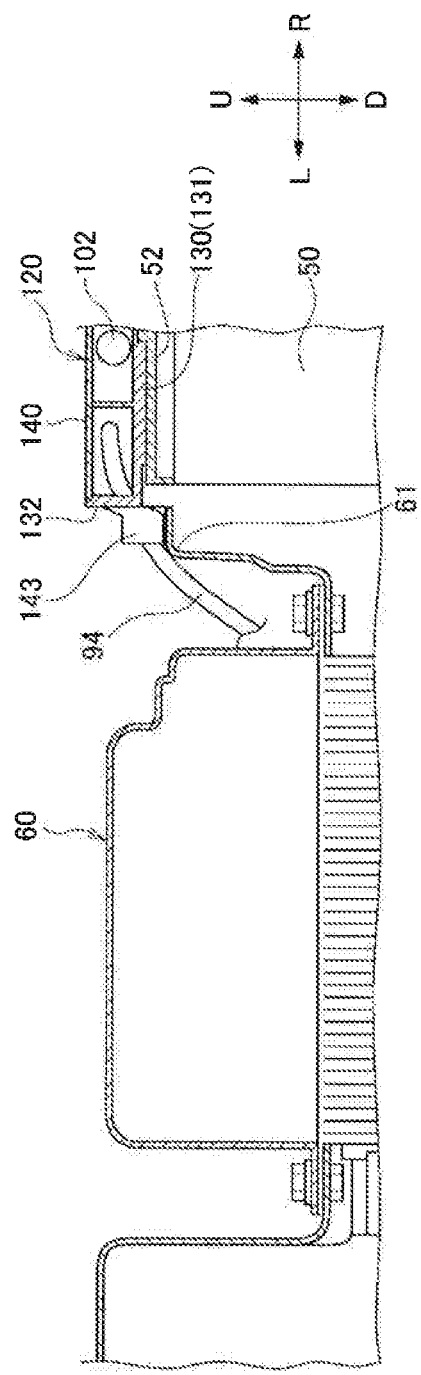

The holder cover 140 includes a positioning part 143 that extends outward from the harness holder 120 to position the PCU control line 94. When viewed in a top view of FIG. 7, the positioning part 143 extends to a position at which it overlaps the PCU case 61 to position the PCU control line 94, and is sandwiched between the PCU cover 62 and the PCU case 61 along with the PCU control line 94. The pinching of the PCU control line 94 caused by the PCU cover 62 or the sound-proof sealing failure caused by the positional deviation of the PCU control line 94 can be reliably prevented. However, to overlap the PCU case 61 in the top view, the removal of the inverter 60 may be obstructed as illustrated in FIG. 9A.

Figure 9B:
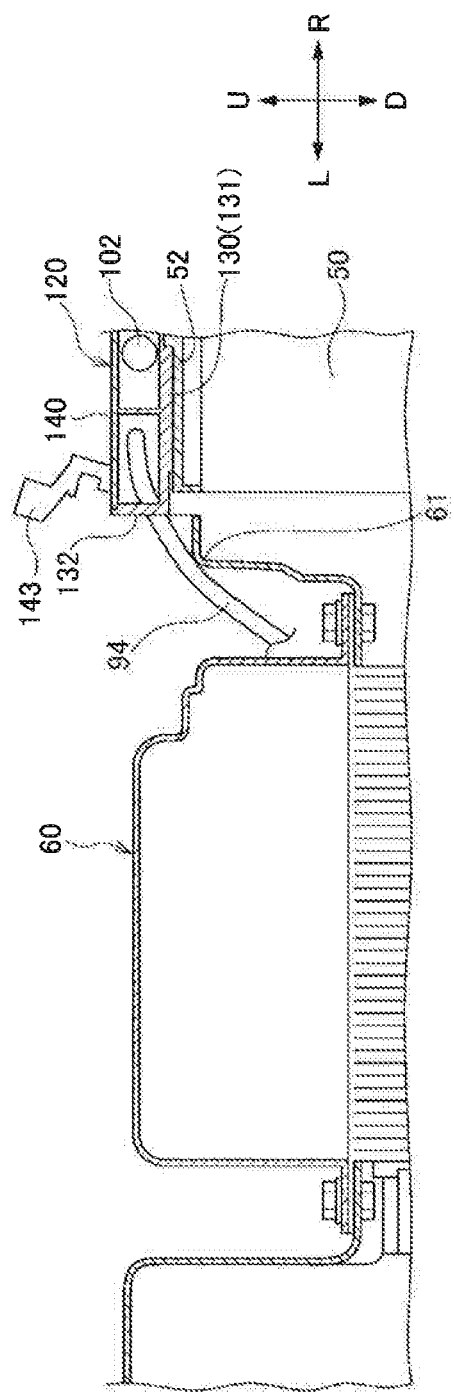
Figure 10:
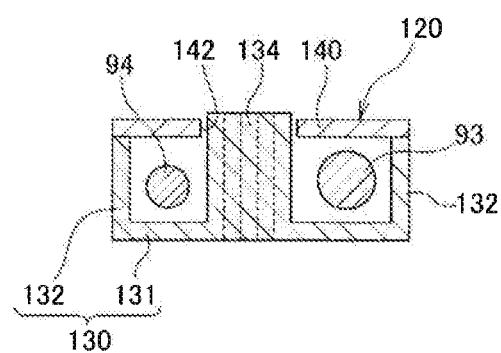
FIG. 10 is a sectional view taken along line A-A of FIG. 7.

As illustrated in FIG. 9B, the positioning part 143 can be rotated relative to the holder cover 140, and is evacuated from an upper side of the PCU case 61 by this rotation. Thereby, even when the entire harness holder 120 is not removed, the inverter 60 can be removed. To be specific, the positioning part 143 of the present embodiment is connected to the holder cover 140 via a bent part 144 that can be bent. Due to rotation obtained using the bent part 144 as a fulcrum, a positioning posture in which the PCU control line 94 is positioned and a jumping posture in which the positioning part 143 is jumped up from the positioning position are switched. The positioning part 143 is provided with engagement segments 145 that are engaged with the engagement claws 136 adjacent to the holder main body 130. When the engagement segments 145 are disengaged, posture switching of the positioning part 143 from the positioning posture to the jumping position is allowed.

As described above, according to the power equipment unit 20 of the present embodiment, the first harness part 101 of the control system harness 100 connecting the battery 50 and the ECU 70 extends in the vertical direction through the space S formed between the battery 50 and the ECU 70. Since the space S formed between the battery 50 and the ECU 70 has generally high safety against the shock in the event of the collision of the vehicle, it is possible to protect the control system harness 100 from the shock in the event of the collision of the vehicle while effectively utilizing a dead space. Further the control system harness 100 includes the ECU connecting part 105 connected to the ECU 70 from below, and thus water such as dew drops is prevented from entering the ECU 70 through the control system harness 100.

In addition, since the control system harness 100 includes the second harness part 102 extending above the battery 50 in the forward/backward direction, the third harness part 103 extending in the vertical direction on the side of the battery 50 opposite to the ECU 70, and the battery connecting part 106 connected to the battery 50 from below, water such as dew drops is prevented from entering the battery 50 through the control system harness 100.

Further, since the second harness part 102 of the control system harness 100 is disposed around the border between the battery 50 and the inverter 60, the control system harness 100 can be disposed while effectively utilizing a space in the power equipment unit 20.

Further since the power equipment unit 20 is housed in the power equipment unit housing 4a formed in the recessed manner in the floor panel 4 and the power equipment unit housing 4a is provided below the front seat 5, it is possible to dispose the power equipment unit 20 at the place having high safety against the shock in the event of the collision of the vehicle and to protect the battery 50, the ECU 70, and the control system harness 100 from the shock in the event of the collision of the vehicle.

The present invention is not limited to the above embodiment, and can be appropriately modified and improved.

For example, in the embodiment, the power equipment unit 20 is disposed below the front seats 5, but without being limited thereto, the power equipment unit 20 may be disposed below the middle seats 6 or the rear seats 7.

The hybrid vehicle is exemplified as the vehicle 1, but without being limited thereto, an electric vehicle, a fuel cell vehicle, or the like may be used.

The invention claimed is:

1. A power equipment unit comprising:
    a power equipment which supplies electric power to a motor;
    a controller which controls the power equipment;
    a harness which connects the power equipment and the controller; and
    a case which houses the power equipment, the controller, and the harness, wherein
    the power equipment and the controller are disposed so as to be adjacent to each other in a forward/backward direction with a space interposed therebetween, and
    the harness includes:
        a first harness part extending through the space in a vertical direction;
        a controller connecting part extending in a leftward/rightward direction from a lower end of the first harness part and connected to the controller from below;
        a second harness part extending above the power equipment in the forward/backward direction;
        a third harness part extending in the vertical direction on a side of the power equipment opposite to the controller; and
        a power equipment connecting part connected to the power equipment from below.

2. The power equipment unit according to claim 1, further comprising a power converter that converts the electric power of the power equipment, wherein
    the power equipment and the power converter are disposed to be adjacent to each other in the leftward/rightward direction, and
    the second harness part is disposed around a border between the power equipment and the power converter.

3. A vehicle in which the power equipment unit according to claim 1 is mounted, wherein
    the power equipment unit is housed in a power equipment unit housing which is formed in a recessed manner in a floor panel, and
    the power equipment unit housing is provided below a seat.

* * * * *